(12) United States Patent
Tsirkin et al.

(10) Patent No.: US 12,455,755 B2
(45) Date of Patent: Oct. 28, 2025

(54) COORDINATING TIMER ACCESS FOR VIRTUAL MACHINES USING PERIPHERAL COMPONENT INTERFACE CARDS

(71) Applicant: Red Hat, Inc., Raleigh, NC (US)

(72) Inventors: Michael Tsirkin, Haifa (IL); Amnon Ilan, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 810 days.

(21) Appl. No.: 17/592,815

(22) Filed: Feb. 4, 2022

(65) Prior Publication Data

US 2023/0251883 A1 Aug. 10, 2023

(51) Int. Cl.
*G06F 9/455* (2018.01)
*G06F 9/48* (2006.01)
(Continued)

(52) U.S. Cl.
CPC ...... *G06F 9/45558* (2013.01); *G06F 9/45545* (2013.01); *G06F 9/4812* (2013.01);
(Continued)

(58) Field of Classification Search
CPC .. G06F 9/4812; G06F 9/4825; G06F 9/45558; G06F 2009/45579; G06F 13/24;
(Continued)

(56) References Cited

U.S. PATENT DOCUMENTS

| 6,243,785 B1 * | 6/2001 | Lowe ..................... G06F 13/24 710/48 |
| 7,945,908 B1 | 5/2011 | Waldspurger et al. |

(Continued)

FOREIGN PATENT DOCUMENTS

WO WO-2017171744 A1 * 10/2017

OTHER PUBLICATIONS

Lim, Jin Tack, and Jason Nieh. "Optimizing Nested Virtualization Performance Using Direct Virtual Hardware." Proceedings of the Twenty-Fifth International Conference on Architectural Support for Programming Languages and Operating Systems. New York, NY, USA: ACM, 2020. 557-574. Web. (Year: 2020).*

(Continued)

*Primary Examiner* — Lewis A Bullock, Jr.
*Assistant Examiner* — John Robert Dakita Ewald
(74) *Attorney, Agent, or Firm* — Kilpatrick Townsend & Stockton LLP

(57) ABSTRACT

Peripheral component interface (PCI) cards can be used to coordinate timer access for virtual machines. For example, a computing device can send, by a virtual machine deployed by a hypervisor, a request for a timer. A guest driver can write a timer for the virtual machine into a first portion of memory on a PCI card. The first portion of memory can be mapped to the virtual machine by the hypervisor. The computing device can receive a card interrupt for the timer. The computing device can translate the card interrupt into a timer interrupt. For example, the card interrupt may be received and translated by the hypervisor or the guest driver. The computing device can inject the timer interrupt to the virtual machine. In some examples, the virtual machine may receive the timer interrupt without exiting to the hypervisor.

20 Claims, 3 Drawing Sheets

(51) Int. Cl.
*G06F 13/16* (2006.01)
*G06F 13/24* (2006.01)
*G06F 13/42* (2006.01)

(52) U.S. Cl.
CPC .......... *G06F 13/1668* (2013.01); *G06F 13/24* (2013.01); *G06F 13/4221* (2013.01); *G06F 2009/45562* (2013.01)

(58) Field of Classification Search
CPC ..... G06F 2213/0024; G06F 2213/0026; G06F 1/14; G06F 13/4221
See application file for complete search history.

(56) References Cited

U.S. PATENT DOCUMENTS

| | | | |
|---|---|---|---|
| 8,533,709 B2 | 9/2013 | Nicholas et al. | |
| 8,627,133 B2 | 1/2014 | Tsirkin et al. | |
| 9,571,412 B2 | 2/2017 | Hussain et al. | |
| 10,169,269 B2* | 1/2019 | Coleman | G06F 9/4812 |
| 10,496,435 B2* | 12/2019 | Bar | G06F 9/4825 |
| 11,023,250 B2* | 6/2021 | Gavrilov | G06F 9/4411 |
| 11,038,807 B2* | 6/2021 | Noureddine | H04L 47/6245 |
| 11,042,495 B2* | 6/2021 | Chan | G06F 9/45545 |
| 2008/0294825 A1* | 11/2008 | Mahalingam | G06F 9/4812 718/1 |
| 2014/0244877 A1* | 8/2014 | Williamson | G06F 13/24 710/262 |
| 2016/0077848 A1* | 3/2016 | Tu | G06F 9/45558 718/1 |
| 2016/0098289 A1* | 4/2016 | Lim | G06F 9/45558 718/1 |

OTHER PUBLICATIONS

Har'El et al., "Efficient and Scalable Paravirtual I/O System", 2013, USENIX Annual Technical Conference, pp. 1-12 (Year: 2013).*
Gordon et al., "ELI: Bare-Metal Performance for I/O Virtualization", 2012, ASPLOS'12, pp. 1-12 (Year: 2012).*
Adamczyk, B. and Chydzinski, A., "Achieving High Resolution Timer Events in Virtualized Environment," PLOSONE, 2015, https://journals.plos.org/plosone/article?id=10.1371/journal.pone.0130887.
Ahmad, I., et al., "Improving Performance with Interrupt Coalescing for Virtual Machine Disk IO in VMware ESX Server," VMWare Inc., https://rcs.uwaterloo.ca/~ali/papers/vpact-vic-nop.pdf.
"Determining and Changing the Rate of Timer Interrupts a Guest Operating System Requests," VMware, Inc., 2017, https://kb.vmware.com/s/article/1005802.
"Timekeeping in VMware Virtual Machines," VMware, Inc., 2008, https://www.vmware.com/pdf/vmware_timekeeping.pdf.

* cited by examiner

COORDINATING TIMER ACCESS FOR VIRTUAL MACHINES USING PERIPHERAL COMPONENT INTERFACE CARDS

TECHNICAL FIELD

The present disclosure relates generally to virtual machines. More specifically, but not by way of limitation, this disclosure relates to coordinating timer access for virtual machines using peripheral component interface cards.

BACKGROUND

Virtualization may be used to provide some physical components as logical objects in order to allow running various software modules, concurrently and in isolation from other software modules, on a computing device or a collection of connected computing devices. Virtualization may allow, for example, for consolidating multiple physical servers into one physical server running multiple guest virtual machines in order to improve the hardware utilization rate. A virtual machine can be a substantially isolated environment that has its own operating system, software applications, and virtualized hardware. For example, a virtual machine can have a virtual Central Processing Unit (vCPU), a virtual Random Access Memory (vRAM), and other components.

Virtualization may be achieved by running a software layer, often referred to as a hypervisor, to manage processor resources allocated to guest virtual machines. The hypervisor may virtualize the physical layer and provide interfaces between the underlying hardware and guest virtual machines and any guest operating systems. The hypervisor can use these interfaces to manage resources given to applications running on a guest virtual machine. Within virtualized systems, CPU timers may be used by the hypervisor and by the guest virtual machines. For example, the hypervisor may use CPU timers and their generated timer interrupts to coordinate allocation of resources and execution of virtual machines. Virtual machines may use timers for timekeeping and to coordinate networking. For example, a timer interrupt may be used to prompt retransmission of data packets. The virtual machines may program CPU timers by exiting to the hypervisor.

DETAILED DESCRIPTION

Figure 1:
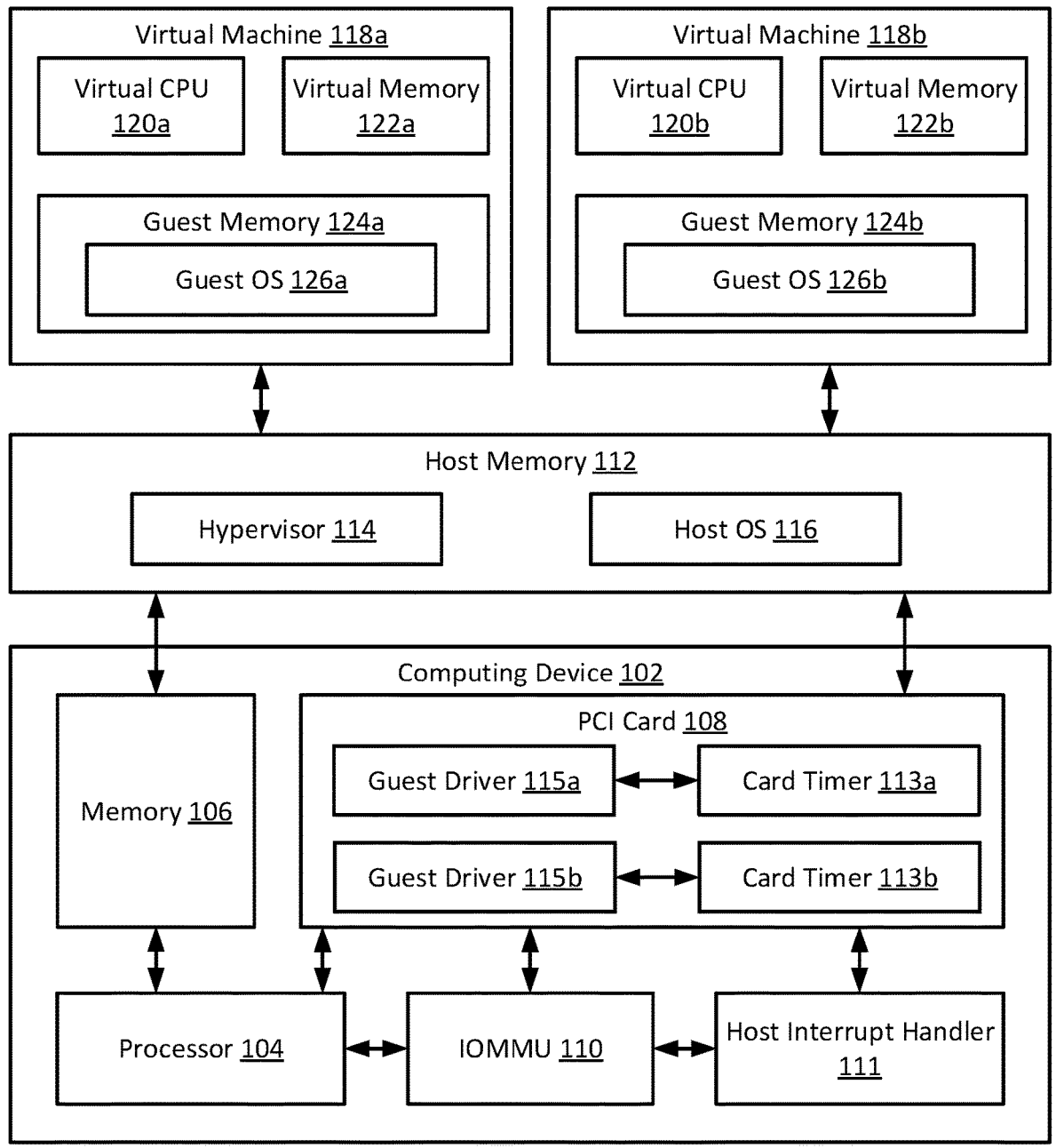
FIG. 1 is a block diagram of an example of a system for coordinating timer access for virtual machines using peripheral component interface (PCI) cards according to some aspects of the present disclosure.

Access to central processing unit (CPU) timers by virtual machines executing on a host CPU can be a significant source of virtualization overhead. For example, a hypervisor executing one or more virtual machines can use CPU timer interrupts to manage time sharing and load balancing for the virtual machines. Meanwhile, the virtual machines may require CPU timer interrupts to coordinate data transmission. While CPU timer interrupts may be relatively rare, CPU timers are often programmed at a high frequency. For example, each data packet received by the host CPU can reset a CPU timer. Both the hypervisor and the virtual machines may access CPU timers, which can cause issues, as a virtual machine may not have full control of the CPU timer. For example, if a timer interrupt is received while the hypervisor is executing a virtual machine, the virtual machine may exit to the hypervisor to determine if the timer interrupt is needed by the host CPU or the virtual machine. Additionally, if a virtual machine needs a CPU timer, such as for timing data packet transmission, the virtual machine may exit to the hypervisor to program the CPU timer. If a response is received before the CPU timer generates a timer interrupt, the virtual machine may again exit to the hypervisor to cancel the CPU timer. Frequent virtual machine exits to access CPU timers may consume processing resources, increase latency, and decrease overall performance of the virtualized system.

Some examples of the present disclosure can overcome one or more of the abovementioned problems by utilizing a peripheral component interface (PCI) card for coordinating timer access for virtual machines. PCI cards are present in many virtualized systems. PCI cards can be hardware devices, such as accelerator cards, that are attached to the host CPU via a PCI module. A PCI card can be programmable and can include device memory. The hypervisor may map regions of the device memory in the PCI card to different virtual machines executing on the host CPU. In this way, each virtual machine may access, such as through guest drivers, their mapped region of device memory, onto which independently operating card timers can be programmed. The card timers may generate card interrupts. The card interrupts can be translated into timer interrupts that can be transmitted to the associated virtual machine. Programming the timer and receiving the timer interrupts can be accomplished without requiring the virtual machine to exit to the hypervisor. Reducing virtual machine exits for coordination of timers using PCI cards can therefore decrease latency, free up resources shared between the virtual machines, and improve the overall performance of the virtualized system.

In one particular example, a computing device can run a hypervisor for provisioning one or more virtual machines. The hypervisor can be a software layer that is conceptually positioned above a physical layer (e.g., the hardware) of the computing device and below the virtual machines. The hypervisor can interface between the physical layer and the virtual machines. The physical layer can include a PCI card that includes device memory. The hypervisor may map a portion of the device memory to each virtual machine to be used for timers. For example, when a virtual machine requires a timer, such as for networking or timing transmission of data packets, the hypervisor may allocate a guest driver for the PCI card to write a card timer into the portion of PCI card device memory that is mapped to that virtual machine. The virtual machines may use the card timers on the PCI card rather than CPU timers. If the card timer expires without being cancelled, the card timer can generate a card interrupt. The guest driver can translate the card interrupt into a timer interrupt. The guest driver can then inject the timer interrupt into the virtual machine. Programming the card timer and receiving the timer interrupt may occur without the virtual machine exiting to the hypervisor. As the device memory for the PCI card is allocated into separate and independent portions for each virtual machine, the hypervisor may execute multiple virtual machines that receive timer interrupts at the same time without exiting to the hypervisor.

In some examples, the hypervisor may translate the card interrupt into a timer interrupt and may inject the timer interrupt into the virtual machine. Alternatively or additionally, the computing device may include an input-output memory management unit (IOMMU). The hypervisor may program the IOMMU to translate the card interrupt. For example, if the virtual machine is executing on the host CPU, the IOMMU may be programmed to translate the card interrupt into a timer interrupt. The IOMMU can then inject the timer interrupt into the executing virtual machine. In some examples, the IOMMU may translate the card interrupt into a generic guest interrupt. The IOMMU may transmit the generic guest interrupt to the guest driver. The guest driver may translate the generic guest interrupt into a timer interrupt. The guest driver may then inject the timer interrupt into the virtual machine.

If the virtual machine is not executing on the host CPU, the IOMMU may be programmed to translate the card interrupt into a host timer interrupt, which is a timer interrupt for the host CPU. The hypervisor may cause a host interrupt handler to wake up the virtual machine and inject the host timer interrupt into the virtual machine.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for coordinating timer access for virtual machines using PCI cards according to some aspects of the present disclosure. More specifically, the system includes a computing device 102. In some examples, the computing device 102 can implement nodes in a distributed computing network. The computing device 102 can execute software as defined below, which causes the computing device 102 to perform the tasks of providing a hypervisor 114 in host memory 112 that resides in the memory 106. The host memory 112 can also include a host operating system (OS) 116. The computing device 102 can include a processor 104, a memory 106, a PCI card 108, an input-output memory management unit (IOMMU) 110, and a host interrupt handler 111. The PCI card 108 may be an accelerator card plugged into a PCI module (not pictured) of the computing device 102.

The computing device 102 can run one or more virtual machines 118a-b by executing the hypervisor 114 and the host OS 116. In some examples, the host OS 116 can execute the hypervisor 114. In other examples, the computing device 102 can execute the hypervisor 114 separately from, or exclusive of, the host OS 116. The hypervisor 114 can virtualize the physical layer, including processors, memory devices, I/O devices, etc. and present this virtualization to the virtual machine 118 as devices, including virtual processors, virtual memory devices, and virtual I/O devices. The virtual machine 118 may run any type of dependent, independent, and compatible applications on the underlying hardware and host OS 116. In this example, the virtual machines 118a-b are each executing a guest OS 126a-b that reside in guest memory 124a-b, which may utilize underlying virtual processing devices, each also referred to herein as a virtual central processing unit (CPU) 120a-b and a virtual memory 122a-b.

A virtual machine 118 may program a card timer 113, such as for networking or packet transmission, by sending a timer request to the hypervisor 114. The hypervisor 114 may program a guest driver 115 on the PCI card 108 to be associated with the virtual machine 118 and to write card timers 113 for the virtual machine 118. The hypervisor 114 may also map portions of memory in the PCI card 108 to different virtual machines 118a-b. Each virtual machine 118a-b may be associated with a different guest driver 115a-b writing card timers 113a-b to different portions of the PCI card 108. In response to receiving the timer request, the guest driver 115 can write a card timer 113 into the mapped portion of memory in the PCI card 108. If the guest driver 115 does not receive a timer cancellation for the card timer 113 before the timer is up, the card timer 113 may generate a card interrupt. The guest driver 115 may translate the card interrupt into a timer interrupt. The guest driver 115 may inject the timer interrupt into the virtual machine 118. The system may include multiple virtual machines 118a-b that may independently and concurrently program and cancel card timers 113a-b and receive timer interrupts without exiting to the hypervisor 114 by accessing memory in the PCI card 108 via the guest drivers 115a-b.

In some examples, the hypervisor 114 may coordinate or execute translation of the card interrupt instead of translating via the guest drivers 115a-b. For example, after a card timer 113a has been written to device memory in the PCI card 108 and a card interrupt for the card timer 113a has been received, the hypervisor 114 may determine if a virtual machine 118a is currently executing. If the virtual machine 118a is executing on the hypervisor 114, the hypervisor 114 may translate the card interrupt into a timer interrupt. The timer interrupt may be in a format that is injectable into the virtual machine 118a without requiring the virtual machine 118a to exit to the hypervisor 114 to receive the timer interrupt. The hypervisor 114 may then inject the timer interrupt into the virtual machine 118a. Alternatively or additionally, the hypervisor 114 may program the IOMMU 110 to translate the card interrupt into the timer interrupt. The IOMMU 110 may then inject the timer interrupt into the virtual machine 118a while the virtual machine 118a is executing.

In some examples, the IOMMU 110 or the hypervisor 114 may translate the received card interrupt into a different format. For example, the IOMMU 110 or the hypervisor 114 may translate the card interrupt into a generic guest interrupt. The generic guest interrupt may be injected by the guest driver 115 to the virtual machine 118. In some examples, the guest driver 115 may translate the generic guest interrupt into a timer interrupt and may inject the timer interrupt into the virtual machine 118.

If the hypervisor 114 determines that the virtual machine 118a is not currently executing, the hypervisor 114 may translate the card interrupt into a host timer interrupt. Alternatively or additionally, the hypervisor 114 may program the IOMMU 110 to translate the card interrupt into the host timer interrupt. The hypervisor 114 or IOMMU 110 may transmit the host timer interrupt to the host interrupt handler 111. The host interrupt handler 111 may power the virtual machine 118a on. The host interrupt handler 111 may then inject the host timer interrupt to the virtual machine 118a while the virtual machine 118a is executing.

In some examples, virtual machines 118a-b may cancel card timers 113a-b before the card timers 113a-b generate card interrupts. To cancel the card timer 113b, the virtual machine 118b may transmit a timer cancellation request to the guest driver 115b. In response to receiving the timer cancellation request, the guest driver 115b may prevent the card timer 113b from generating the card interrupt by cancelling the card timer 113b. Additionally or alternatively, the hypervisor 114 or the IOMMU 110 programmed by the hypervisor 114 may cancel the card timer 113b in response to receiving the timer cancellation request.

Although the above examples describe the guest drivers 115a-b as performing certain steps and the hypervisor 114 as performing others, any number and combination of the components shown in FIG. 1 can implement any number and combination of the steps discussed herein. For instance, in one example, the IOMMU 110 (rather than the hypervisor 114) can receive card interrupts and, in response, perform some or all of the abovementioned steps. The computing device 102 can implement any number and combination of steps using any number and combination of suitable software (e.g., the guest OS 126a-b, the host OS 116, or both). Although two virtual machines 118a-b and guest drivers 115a-b are depicted, any number of virtual machines 118 and associated guest drivers 115 may be included.

Figure 2:
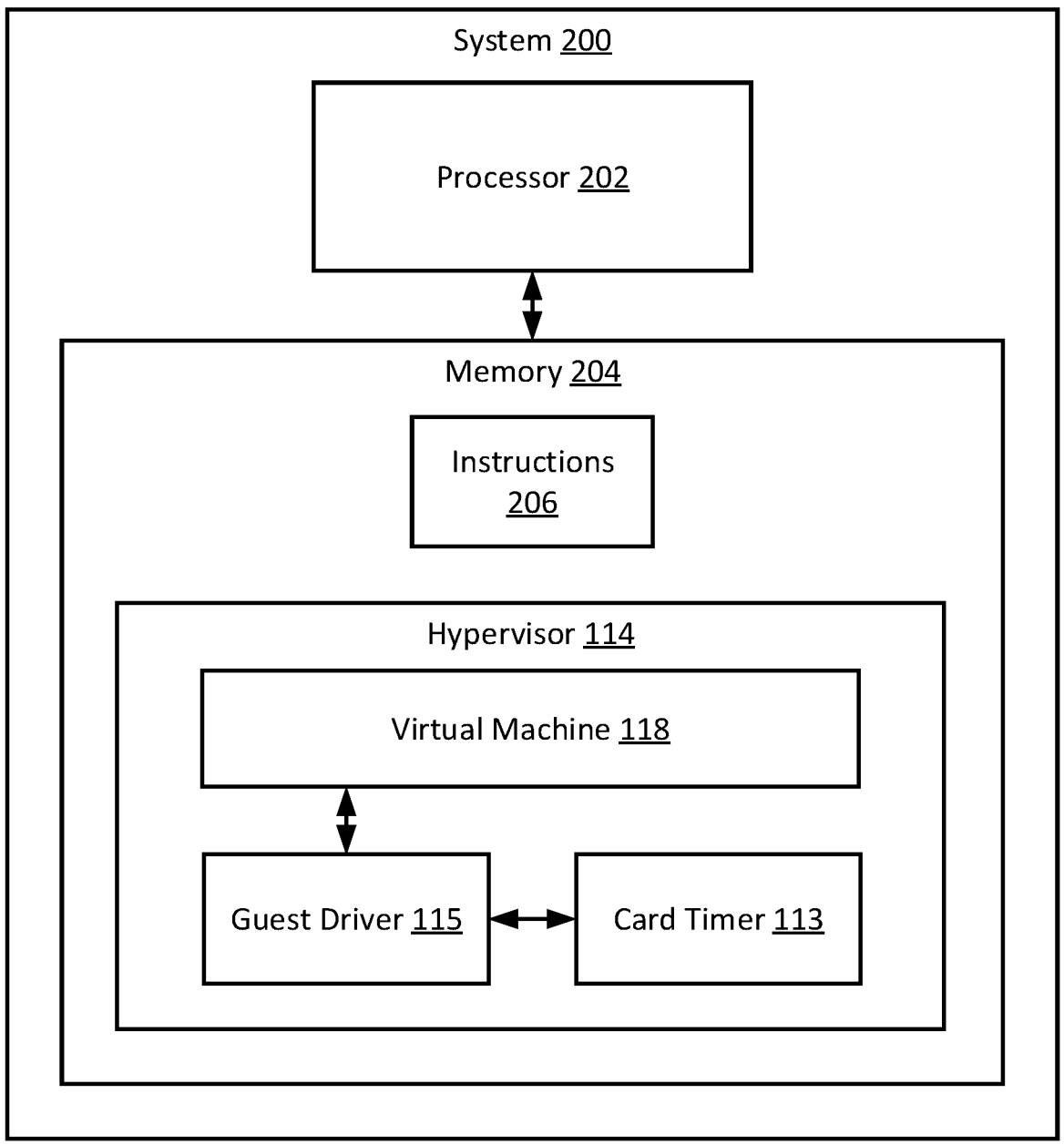
FIG. 2 is a block diagram of another example of a system for coordinating timer access for virtual machines using PCI cards according to some aspects of the present disclosure.

FIG. 2 is a block diagram of another example of a system for coordinating timer access for virtual machines using PCI cards according to some aspects of the present disclosure. The system 200 includes a processor 202 communicatively coupled to a memory 204. In some examples, the processor 202 and the memory 204 can be the processor 104 and the memory 106, respectively, of FIG. 1.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. In some examples, at least some of the memory can include a medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the memory 204 can include device memory for a PCI card 108 that is plugged into a PCI module (not pictured) of the system 200. The system may execute instructions 206 to run a hypervisor 114 that executes a virtual machine 118. The hypervisor 114 may allocate a guest driver 115 for the PCI card 108 to the virtual machine 118. The hypervisor 114 may also map a portion of memory of the PCI card 108 to the virtual machine 118. The virtual machine 118 may transmit a timer request to the hypervisor 114. The guest driver 115 may write a timer for the virtual machine 118 into the mapped portion of memory of the PCI card 108. The guest driver 115 may receive a card interrupt from the timer. The guest driver 115 may translate the card interrupt into a timer interrupt. The guest driver 115 may inject the timer interrupt into the virtual machine 118.

Figure 3:
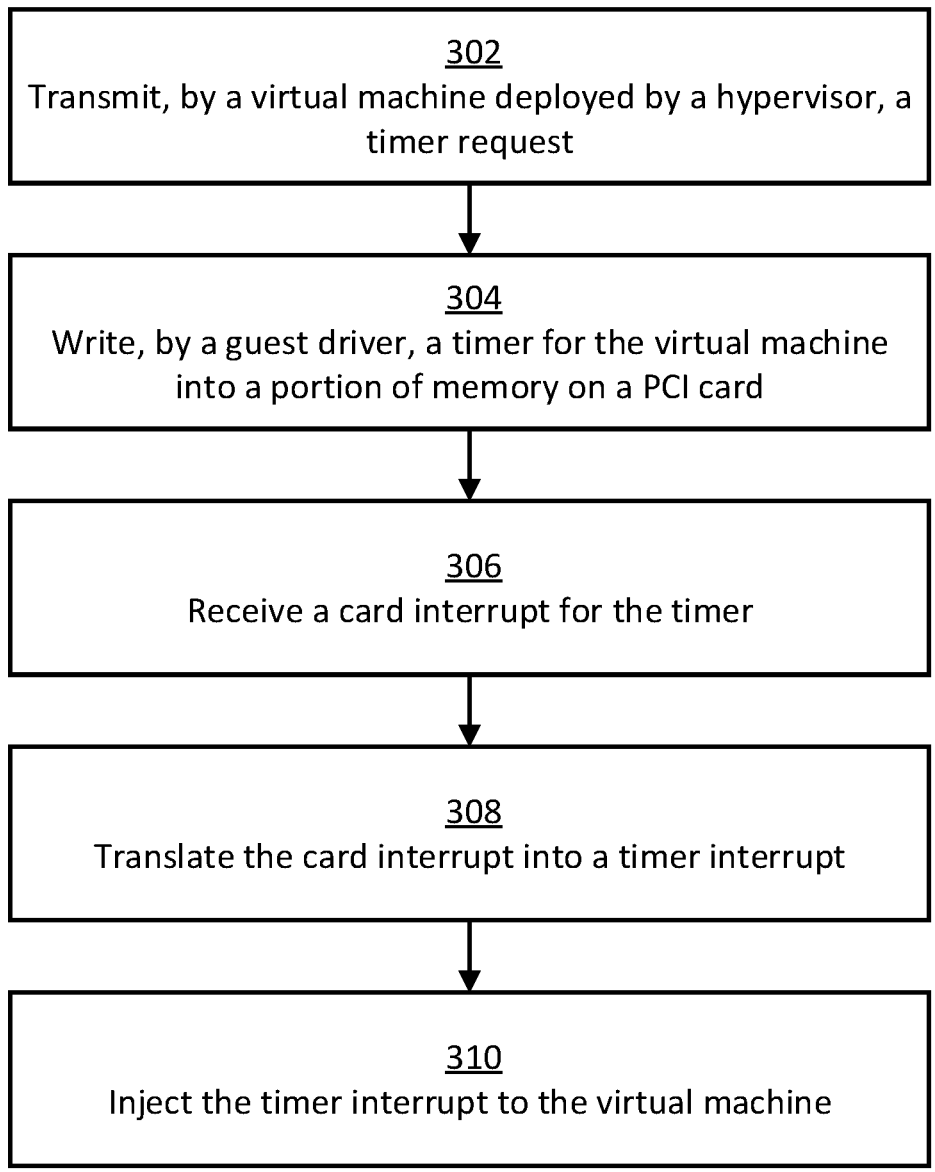
FIG. 3 is a flow chart of an example of a process for coordinating timer access for virtual machines using PCI cards according to some aspects of the present disclosure.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

At block 302, a virtual machine 118 can transmit a timer request. For example, the virtual machine 118 may transmit a timer request for use in networking to coordinate data packet transmission. The virtual machine 118 may be deployed by a hypervisor 114. The virtual machine 118 may continue executing on the hypervisor 114 after transmitting the timer request without exiting to the hypervisor 114. The hypervisor 114 may receive the timer request and may allocate a guest driver 115 on a PCI card 108 to handle timers for the virtual machine 118. The PCI card 108 may include multiple memory portions, and each portion can be mapped by the hypervisor 114 to a particular virtual machine 118. The hypervisor 114 can program multiple guest drivers 115 that are each associated with a particular and different virtual machine 118. In some examples, the timer request can be sent by the guest OS 126 of the virtual machine 118.

At block 304, in response to receiving the timer request, the guest driver 115 that is associated with the virtual machine 118 can write a timer, such as card timer 113, for the virtual machine 118 into memory for the PCI card 108. The timer can be written into PCI card 108 memory that has been mapped to the virtual machine 118. The timer can be written by the guest driver 115 without requiring the virtual machine 118 to exit to the hypervisor 114.

In some examples, the virtual machine 118 may transmit a timer cancellation request to the guest driver 115 or the hypervisor 114 while the virtual machine 118 is executing and before the timer generates a card interrupt. For example, if a timer interrupt is no longer needed to prompt retransmission of a data packet, the virtual machine 118 may send a timer cancellation request. In response to receiving the timer cancellation request, the guest driver 115 can prevent the timer from generating the card interrupt by cancelling the timer. Alternatively, the virtual machine 118 may not require cancellation of the timer and the process may continue to block 306.

At block 306, the system 200 can receive a card interrupt for the timer. For example, the card interrupt may be received by the guest driver 115, the hypervisor 114, or the IOMMU 110. The card interrupt may be generated by the timer if the timer expires without being cancelled. For example, the card interrupt may be a message signaled interrupt (MSI). The card interrupt may require translation into a different format to be receivable by the virtual machine 118. At block 308, the system 200 can translate the card interrupt into a timer interrupt for the virtual machine 118. For example, the guest driver 115 can translate the card interrupt into a timer interrupt. Alternatively, the card interrupt may be translated by other components in the computing device 102. For example, the hypervisor 114 may translate the card interrupt into the timer interrupt. In another example, the IOMMU 110 may be programmed by the hypervisor 114 to translate the card interrupt into a generic guest interrupt. The IOMMU 110 may transmit the guest interrupt to the guest driver 115, and the guest driver 115 may translate the guest interrupt into a more specific timer interrupt for the virtual machine 118.

In other examples, the component used to translate the card interrupt may vary based on the state of the virtual machine 118. For example, if the virtual machine 118 is executing, the card interrupt may be translated by the guest driver 115, the hypervisor 114, the IOMMU 110, or another component in the computing device 102. If the virtual machine 118 is not executing, the IOMMU 110 can translate the card interrupt into a host timer interrupt. The IOMMU 110 can then transmit the host timer interrupt to a host interrupt handler 111.

At block 310, the system 200 can inject the timer interrupt to the virtual machine 118. For example, the guest driver 115 may inject the timer interrupt. Alternatively, the hypervisor 114, IOMMU 110, the host interrupt handler 111, or any other component in the computing device 102 may inject the timer interrupt to the virtual machine 118. For example, if the virtual machine 118 is not executing, the host interrupt handler 111 may receive a host timer interrupt translated by the IOMMU 110 and may power on the virtual machine 118 to inject the host timer interrupt. The virtual machine 118 may receive the timer interrupt for use in virtual machine applications or functions, such as timekeeping or networking. The virtual machine 118 may receive the timer interrupt without exiting to the hypervisor 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a processor; and
a memory including instructions that are executable by the processor for causing the processor to:
transmit, by a virtual machine deployed by a hypervisor, a timer request;
in response to receiving the timer request, write, by a guest driver, a timer for the virtual machine into a first portion of memory on a peripheral component interface (PCI) card, the first portion of memory being mapped to the virtual machine by the hypervisor;
receive, from the PCI card, a card interrupt for the timer;
translate the card interrupt into a timer interrupt; and
inject, by the hypervisor, the timer interrupt to the virtual machine while the virtual machine is executing.

2. The system of claim 1, wherein the memory further comprises instructions executable by the processor for causing the processor to:
receive, by the virtual machine, the timer interrupt without exiting to the hypervisor.

3. The system of claim 1, wherein the card interrupt is a first card interrupt and the timer interrupt is a first timer interrupt, wherein a second card interrupt from the PCI card is received and translated into a second timer interrupt by the guest driver, and wherein the second timer interrupt is injected by the guest driver to the virtual machine while the virtual machine is executing.

4. The system of claim 1, wherein the card interrupt is a first card interrupt and the timer interrupt is a first timer interrupt, wherein a second card interrupt from the PCI card is received by an input-output memory management unit, and wherein the input-output memory management unit is configured to:
determine, by the hypervisor, that the virtual machine is executing;
in response to receiving the second card interrupt and determining that the virtual machine is executing, translate the second card interrupt into a second timer interrupt; and
inject the second timer interrupt to the virtual machine while the virtual machine is executing.

5. The system of claim 1, wherein the card interrupt is a first card interrupt, wherein a second card interrupt is received from the PCI card by an input-output memory management unit, and wherein the input-output memory management unit is configured to:
determine, by the hypervisor, that the virtual machine is not executing;
in response to receiving the second card interrupt and determining that the virtual machine is not executing, translate the second card interrupt into a host timer interrupt; and
transmit the host timer interrupt to a host interrupt handler;
wherein the host interrupt handler is configured to:
power on the virtual machine; and
inject the host timer interrupt to the virtual machine.

6. The system of claim 1, wherein the card interrupt is received by the hypervisor, and wherein the hypervisor is configured to translate the card interrupt into the timer interrupt.

7. The system of claim 1, wherein the memory further comprises instructions executable by the processor for causing the processor to:
transmit, by the virtual machine, a timer cancellation request to the guest driver; and
in response to receiving the timer cancellation request, prevent the guest driver from generating the card interrupt.

8. The system of claim 1, wherein the virtual machine is a first virtual machine of a plurality of virtual machines deployed by the hypervisor, wherein the first portion of memory is included in a plurality of portions of memory in the PCI card, and wherein each portion of memory of the plurality of portions of memory is mapped to a separate virtual machine of the plurality of virtual machines and includes an independently operating timer.

9. A method comprising:
transmitting, by a virtual machine deployed by a hypervisor, a timer request;
in response to receiving the timer request, writing, by a guest driver, a timer for the virtual machine into a first portion of memory on a peripheral component interface (PCI) card, the first portion of memory being mapped to the virtual machine by the hypervisor;
receiving, from the PCI card, a card interrupt for the timer;
translating the card interrupt into a timer interrupt; and
injecting, by the hypervisor, the timer interrupt to the virtual machine while the virtual machine is executing.

10. The method of claim 9, further comprising:
receiving, by the virtual machine, the timer interrupt without exiting to the hypervisor.

11. The method of claim 9, wherein the card interrupt is a first card interrupt and the timer interrupt is a first timer interrupt, wherein a second card interrupt is received from the PCI card and translated into a second timer interrupt by the guest driver, and wherein the second timer interrupt is injected by the guest driver to the virtual machine while the virtual machine is executing.

12. The method of claim 9, wherein the card interrupt is a first card interrupt and the timer interrupt is a first timer interrupt, wherein a second card interrupt from the PCI card is received by an input-output memory management unit, and wherein the method further comprises:
in response to receiving the second card interrupt and determining that the virtual machine is executing, translating, by the input-output memory management unit, the second card interrupt into a second timer interrupt; and
injecting, by the input-output memory management unit, the second timer interrupt to the virtual machine while the virtual machine is executing.

13. The method of claim 9, wherein the card interrupt is a first card interrupt, wherein a second card interrupt is received from the PCI card by an input-output memory management unit, and wherein the method further comprises:
in response to receiving the second card interrupt and determining that the virtual machine is not executing, translating, by the input-output memory management unit, the second card interrupt into a host timer interrupt;
transmitting, by the input-output memory management unit, the host timer interrupt to a host interrupt handler;
powering on, by the host interrupt handler, the virtual machine; and
injecting, by the host interrupt handler, the host timer interrupt to the virtual machine.

14. The method of claim 9, wherein the card interrupt is received by the hypervisor, and wherein the hypervisor is configured to translate the card interrupt into the timer interrupt.

15. The method of claim 9, further comprising:
transmitting, by the virtual machine, a timer cancellation request to the guest driver; and
in response to receiving the timer cancellation request, preventing the guest driver from generating the card interrupt.

16. The method of claim 9, wherein the virtual machine is a first virtual machine of a plurality of virtual machines deployed by the hypervisor, wherein the first portion of memory is included in a plurality of portions of memory in the PCI card, and wherein each portion of memory of the plurality of portions of memory is mapped to a separate virtual machine of the plurality of virtual machines and includes an independently operating timer.

17. A non-transitory computer-readable medium comprising program code that is executable by a processor for causing the processor to:
transmit, by a virtual machine deployed by a hypervisor, a timer request;
in response to receiving the timer request, write, by a guest driver, a timer for the virtual machine into a first portion of memory on a peripheral component interface (PCI) card, the first portion of memory being mapped to the virtual machine by the hypervisor;
receive, from the PCI card, a card interrupt for the timer;
translate the card interrupt into a timer interrupt; and
inject, by the hypervisor, the timer interrupt to the virtual machine while the virtual machine is executing.

18. The non-transitory computer-readable medium of claim 17, wherein program code is executable to further cause the processor to:
receive, by the virtual machine, the timer interrupt without exiting to the hypervisor.

19. The non-transitory computer-readable medium of claim 17, wherein the card interrupt is a first card interrupt and the timer interrupt is a first timer interrupt, wherein a second card interrupt is received and translated into a second timer interrupt by the guest driver, and wherein the second timer interrupt is injected by the guest driver to the virtual machine while the virtual machine is executing.

20. The non-transitory computer-readable medium of claim 17, wherein the card interrupt is a first card interrupt and the timer interrupt is a first timer interrupt, wherein a second card interrupt is received by an input-output memory management unit, and wherein the input-output memory management unit is configured to:
in response to receiving the card interrupt and determining that the virtual machine is executing, translate the second card interrupt into a second timer interrupt; and
inject the second timer interrupt to the virtual machine while the virtual machine is executing.

* * * * *